United States Patent [19]

Eder et al.

[11] Patent Number: 4,552,085
[45] Date of Patent: Nov. 12, 1985

[54] PLANKING ASSEMBLY AND METHOD OF MAKING SAME

[75] Inventors: Theodor Eder, Perchtolsdorf; Jaroslav Koser, Ranshofen, both of Austria

[73] Assignees: Theodor Eder; Austria Metall Aktiengesellschaft, both of Vienna, Austria

[21] Appl. No.: 573,362

[22] Filed: Jan. 24, 1984

[30] Foreign Application Priority Data

Jan. 24, 1983 [AT] Austria ................................. 218/83

[51] Int. Cl.⁴ ............................................. B63B 3/00
[52] U.S. Cl. ........................................ 114/84; 114/86; 114/88
[58] Field of Search ................ 114/65 R, 74 A, 79 R, 114/79 W, 80, 83, 84, 86, 87, 88, 355, 356, 359, 85

[56] References Cited

U.S. PATENT DOCUMENTS

| | | | |
|---|---|---|---|
| 2,246,579 | 6/1941 | Ewertz | 114/79 W |
| 2,348,188 | 5/1944 | Boyer | 114/86 |
| 3,156,210 | 11/1964 | Lyon | 114/84 |
| 3,246,349 | 4/1966 | Lyon | 114/84 |
| 3,811,141 | 5/1974 | Stoeberl | 114/88 |
| 3,854,435 | 12/1974 | Kinoshita | 114/65 R |
| 4,457,249 | 7/1984 | Disen | 114/88 |

FOREIGN PATENT DOCUMENTS

| | | | |
|---|---|---|---|
| 616693 | 3/1961 | Canada | 114/88 |
| 113476 | 2/1918 | United Kingdom | 114/88 |

Primary Examiner—Trygve M. Blix
Assistant Examiner—Stephen P. Avila
Attorney, Agent, or Firm—Karl F. Ross; Herbert Dubno

[57] ABSTRACT

A plank assembly for the formation of a ship's hull comprises interengaging hooks in only line contact with one another and enabling angular displacement of the two planks about an axis. The planks are also provided with arcuate flanges centered on this and bolted together and with attachment flanges enabling the planks to be secured to transverse ribs of the ship's hull.

12 Claims, 8 Drawing Figures

PLANKING ASSEMBLY AND METHOD OF MAKING SAME

CROSS REFERENCE TO RELATED APPLICATION

This application is related to our commonly owned copending application Ser. No. 311,014 filed Oct. 13, 1981 entitled BOAT HULL AND METHOD OF MAKING SAME.

FIELD OF THE INVENTION

Our present invention relates to a planking assembly, e.g. for a boat hull, and to a method of making same. More particularly, the invention relates to planking assemblies in which doubly-curved planks, adapted to form a ship's hull, have longitudinally extending hook formations along their interengaging edges and are sealingly connected at these edges.

BACKGROUND OF THE INVENTION

It is known to provide ships' hulls from planking in which the individual profile members are doubly-curved members of uniform cross section over the entire length of each plank and the planks are interconnected along their longitudinal edges by interfitting formations which may be sealed with respect to one another by appropriate sealing materials. Transverse struts or ribs may be provided to which the planks can be attached to hold them in place in the hull structure.

The planking assemblies of the prior art include U-profiles or channels which are bolted together or which can have longitudinal edge formations of a cylindrical configuration which engage one into another as a cylindrical head in a socket. This allows pivoting of one plank relative to another only with predetermined angular positions of the two planks. A disadvantage of such systems is that the interconnection can spring loose with even relatively moderate impacts upon the hull and even without considerable transverse tensile forces. Thus the principal strength of these joints is established by the connection to the ribs or by the other reinforcing means than the interfitting portions of the longitudinal edges.

Even when the flanges are bolted together, there are problems since considerable transverse forces tend to elastically or plastically deform the flanges, partly as a consequence of the necessary spacing of the screws, thereby opening the joints and causing a loss of watertightness of the hulls. Indeed, with these systems the screw or bolt connections can be ruptured in the case of collision.

OBJECTS OF THE INVENTION

It is the principal object of the present invention to provide a planking assembly, especially for a boat hull or like hollow body, whereby these disadvantages are obviated.

Another object of the invention is to improve upon the approach and system described in the aforementioned copending application.

Yet a further object of this application is to provide a flexible yet tight joint between two planks of a planking assembly which is capable of resisting separation even in the event of impact or collision and which can be assembled more readily than earlier planking constructions.

SUMMARY OF THE INVENTION

These objects and others which will become apparent hereinafter are attained, in accordance with the present invention, in a planking assembly for ships' hulls or other hollow bodies and in which the planking assembly comprises a pair of doubly-curved planks, i.e. planks curved in the longitudinal direction and in the transverse direction which are formed at adjoining longitudinal edges with a hook connection. According to the invention, one of these planks is formed with an inwardly turned hook while the other of these planks is formed with an outwardly directed hook engageable in the inwardly turned hook. The hook formations form part of the extruded or molded plank structure which is of uniform cross section over the entire length of the plank. It is essential for the purposes of the present invention that these hooks engage with play and engage with only a line contact with one another while means is provided for retaining the hook in line contact so that the connection is a tension-force resisting connection over the entire length of the plank assembly.

Each of the hook-shaped formations is provided, according to a feature of the invention and internally of the planking assembly with a flange of circular segmental configuration spaced from the line of contact of the hooks and juxtaposed with one another, means, e.g. bolts, being provided to secure these flanges together. Preferably between these flanges a sealing layer is disposed and the centers of curvatures of these flanges lie along a center at which the inner hook can pivot with respect to the outer hook.

Any space between the hook formations can be filled with a permanently elastic sealing mass which can be sealed with respect to the exterior by a wedge driven into the gap between the two planks.

This wedge can have a cross section such that it is also curved and at least along one flank has a radius of curvature which corresponds to the center or pivot axis of the interengaging hooks. The other flank of the wedge can be angled to engage the corresponding flank of the groove between the flanks into which the hooks are driven and one or both of the flanks of the groove can be toothed to ensure a firm engagement with the wedge.

According to another feature of the invention, the space between the hook and the arcuate flanges can be filled by sealing masses injected into this space through suitable boars provided to communicate therewith.

It has been found to be advantageous, moreover, to provide one of the planks with an additional arcuate flange which may curve in a direction away from its first-mentioned flange and may have the same center of curvature for engagement with a transverse rib or strut to which this additional flange can be bolted.

The transverse ribs can be of U-shaped or channel cross section and can have semicircular webs or ribs which allow bolting to the preferably arcuate second flanges in any selected angular position. These second flanges may also be referred to as attachment flanges hereinafter.

According to the invention, furthermore, the flange ends can be reinforced inwardly to facilitate the connection of bulk heads or the like thereto.

In the ship's hull construction of the present invention, the planking forming the hull can have inwardly directed hook formations of the type described to engage outer hook formations of planking adapted to form the deck or a deck of the hull structure.

The latter planking can be provided with means, e.g. flanks or formations, engageable with boards adapted to form the decking material, or other fastening elements which are engageable with synthetic resin materials capable of forming such decking materials. In the case of the outer hull plank which is engageable with a deck plank, it has been found to be advantageous to provide the hook formation which is engaged by the deck plank such that it extends inwardly at about 90° to the outer hull wall while the outer hull plank is continued upwardly with a rib or web at substantially 90° to this hook formation and hence to the deck.

Alternatively, an adapter plank can be bolted to an inwardly extending rib or flange of an outer plank and can be provided with the hook formation previously described which is engageable with the deck plank. In this case an additional flange may extend upwardly beyond the adapter flange and at 90° thereto.

According to another aspect of the invention, the ship's hull of the invention is formed by assembling a plurality of transverse ribs, preferably of inwardly open channel configuration and longitudinal members bridging these ribs to form the skeleton. The planking assemblies of the invention are then applied to this skeleton. Advantageously, the hull is formed in two halves by assembling the planks beginning with the uppermost or deck planking, the two halves are then assembled together, the projecting portions of the profiled planks which obstruct the junction plane are cut away and the two half shelves are welded together with a longitudinal seam which simultaneously forms the keel seams. The decks can be formed together with the respective hull halves or can be assembled on a mounting frame and then bolted to the hull structure. The resulting ship may have a support structure to which the transverse ribs are connected and which carries the mast, the motor and the keel and which distributes the loads of these elements substantially uniformly to the planks.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
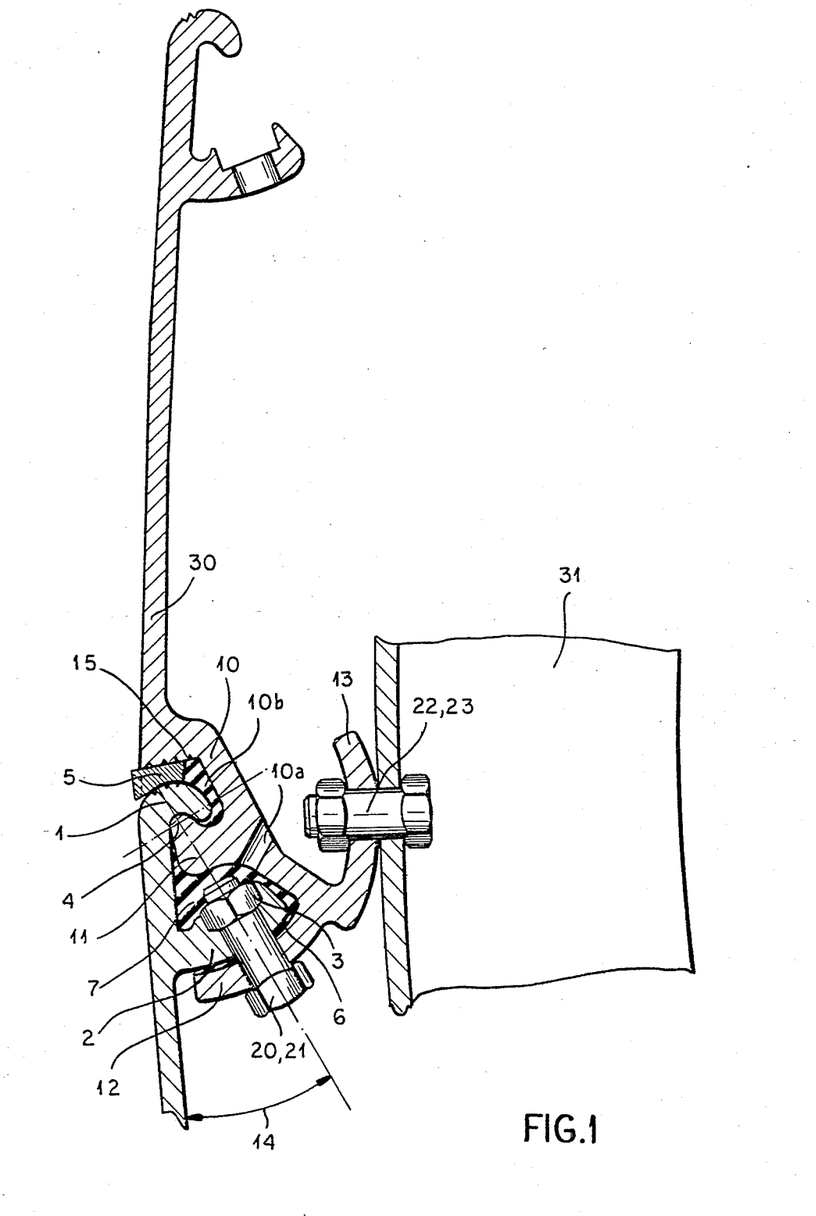
FIG. 1 is a vertical section of a planking assembly according to the invention with the transverse ribs shown in part.

As can be seen from FIG. 1, a planking assembly adapted to form the outer hull of the body of a ship or boat, comprises a plurality of substantially identical aluminum extruded profiles or planks 30 which have double curvature, i.e. are curved in the vertical direction and in the longitudinal direction, the latter being perpendicular to the plane of the paper in FIG. 1.

Each of the planks is provided with a pair of hook formations 1, 11 at the respective opposite longitudinal ends and the planks are of uniform cross section over their entire lengths (see the aforementioned application).

The hook formations include an outer hook 1 in which an inner hook 11 is engageable so that the nose of the inner hook 11 is somewhat narrower than the crotch formed by the outer hook 1 and a pivoting relationship between the two hooks is established whereby the two hooks, while maintaining a line contact with one another, can relatively pivot by an angle of up to 15°

The adjoining pairs of planks 30 are held together by bolts 20, 21. These bolts traverse circular segmental flanges 2, 12 which are respectively spaced inwardly of the hooks 1 and 11 and are juxtaposed with one another as can be seen in FIG. 1 since the arcuate flange 2 projects inwardly behind the hook 11 and the flange 12 projects outwardly behind the hook 11 and the flange 2. The pivot axis defined by the hooks 1 and 11 has been represented at 4 and, as can be seen from FIG. 1 as well, the flanges 2 and 12 have centers of curvature coinciding with the axis 4, i.e. are coaxial with one another and with the hooks.

Within the range of angular displacement, therefore, the bolts 20 and 21 can lock the hook formations together.

The curvature of the flanges and the hooks can be substantially cylindrical despite the double curvature of the planks and, if necessary, the curvature of these members can be changed by pressing or deformation upon assembly to permit free angular displacement within the 15° limits described above as may be required because of the reduced whole curvature in the longitudinal direction. The curvature can be changed as required for assembly and proper positioning in the regions of reduced ships whole curvature by pressing to correspondingly reduce the bulging of the flanges or hook formations.

A watertight seal can be provided between these flanges 2 and 12 by sandwiching a sealing strip 6 between them.

Advantageously, a nut 3 for each bolt 20, 21, is seated in an appropriate recess of the inner surface of the arcuate flange 2 so that this nut is prevented from rotating and can receive the respective bolt. The nut may also be held in place by an appropriate adhesive or by other bonding means.

Bolting is effected after the two planks have been engaged in the manner shown in FIG. 1 and the appropriate angular position 14 is established. The bolts, of course, are inserted from the inside and are tightened into the previously positioned nuts.

Figure 3:
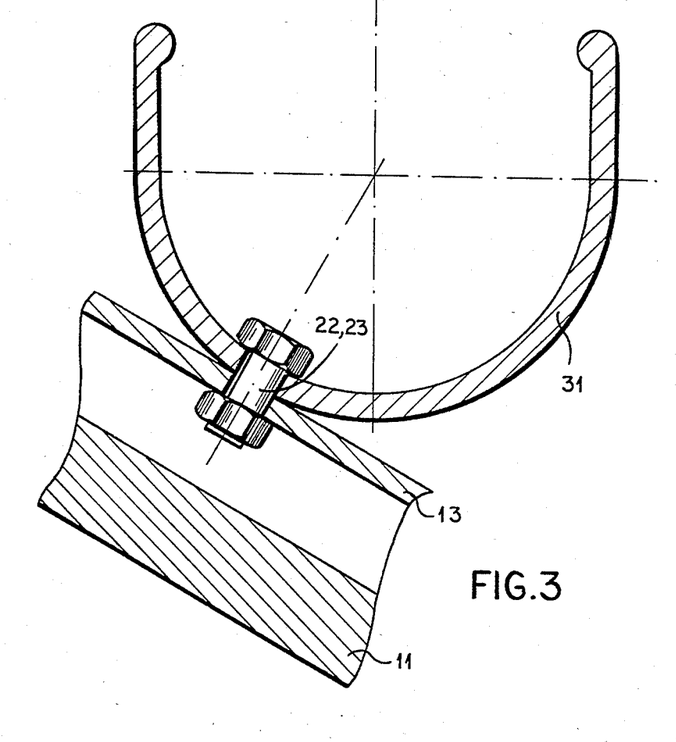
FIG. 3 is a horizontal section taken in a plane perpendicular to the sectional plane of FIGS. 1 and 2 illustrating the connection of the planking assembly to a transverse strut or rib.

Because of the large distance between the bolts and the center of pivotal movement of the hooks at 4, the joint has high torsional or rotational stiffness. The connection of the profile 30 with the transverse ribs 31 is effected via attachment flanges 13 which, like the flanges 12, are coaxial with the axis 4, i.e. have the same center of curvature and which can be extensions of the flanges 12 or the connecting ribs 10 carrying these flanges 12 and the respective hook 11. Bolts 22 and 23 connect the flanges 13 with the transverse ribs 31 which are semicircular (FIG. 3) in cross section and have free ends which are reinforced. The ribs 31 can be extruded aluminum profiles as well and are bent to define the transverse profile of the ship's hull. These reinforce ends can receive between them bolt heads or the like which can be inserted from above since the journals formed by these ribs are open upwardly as well.

After the joint is formed as shown in FIG. 1 and the assembly is secured to the respective transverse rib 31, the space 7 between the flanges 2 and 12 and the hook formations 1 and 11 is filled with an injected sealing mass as illustrated. This mass is injected through the bores 10a.

Such a sealing mass can also be introduced at 10b between the ends of the hook 1 and the rib 10 and the groove defined between the end of this hook 1 and the adjoining plank 30 can be filled by a metal wedge which is driven into this groove.

The metal wedge 5 has a curved flank which can have a radius of curvature centered on the axis 4 and hence a center of curvature corresponding to the axis 4 and a cross section which corresponds to the cross section of the groove so that its opposite flank corresponds to the angular orientation of the outer flank of this groove.

To ensure firm retention of the wedge 5 in place, the flanks of the groove are toothed at 15 with a sawtooth configuration opposite the sawtooth configuration provided on the wedge flanks so that these teeth retain the wedge in the groove after it is driven into the latter.

Once the wedge is driven into the groove, and such a wedge can be driven into the groove formed in all angular positions of the joint, any projecting portion of the wedge is ground, milled or otherwise cut away to leave it flush with the outer surfaces of the planks, the hull then being painted, lacquered or otherwise coated with sealing and protective coverings.

Figure 4:
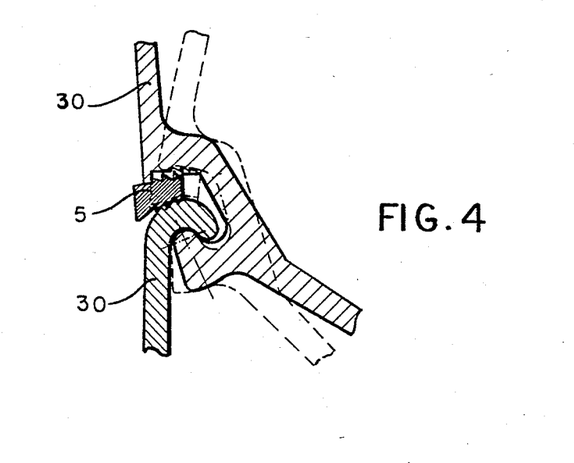
FIG. 4 is a detail view of the interengagement of two hooks of a pair of planks connected by a planking assembly of the invention illustrating the various positions in which these planks can be connected.

As can be seen from FIG. 4, the joint can also be formed with a negative curvature of the ship's wall with the gap serving to allow the hooks to be interengaged over the entire length of the planks and the planks swung into their required positions. The wedge 5 can always be driven into place to seal and secure the joint.

Figure 2:
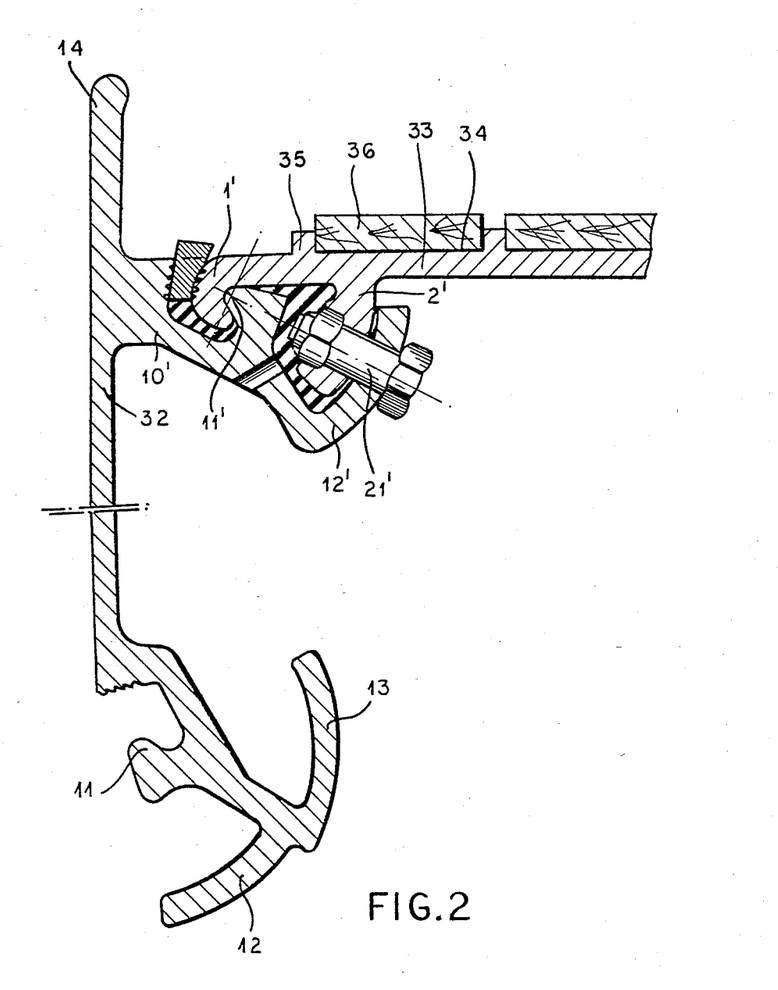
FIG. 2 is a similar view of a planking assembly showing the connection of a deck structure to the outer plank.

For connection of a deck to the hull assemblies, the uppermost plank 32 can be provided with a transverse rib 10' at a right angle or 90° to the body of the plank for engagement with deck profiles or planks 33 with similar hook and flange-connecting formations.

The deck planks 33 are also provided with upwardly extending ribs 35 between which teakwood planks 36 can be inserted for forming the deck covering.

The profile 32 can be formed at its lower end with the hook formation 11 and the flanges 12 and 13 enabling it to be secured to a further plank 30 forming the hull structure.

A rib 14 can extend upwardly beyond the deck to continue the plank 32 and at right angles to the rib 10' and the rib 10' can be formed, as previously described, with a hook 11' and an arcuate flange 12'. Similarly, the plank 33 can have a hook 1' and an arcuate flange 2' engageable with the hook 11' and juxtaposed with the flange 12', respectively, so that a bolt 21' can secure the joint together. A sealing mass and wedge arrangement can be used in this system as well.

To improve the bonding of the deck boards 36 with the plank 33, the deck board 36 can be set in adhesive beds 34 disposed between the ribs 35 or the ribs 35 can be provided with teeth engaging these boards or can be undercut to engage over the boards.

The formation of the deck and the mounting of the deck boards can be effected simultaneously with the application of the half shell of the hull as described.

Figure 5:
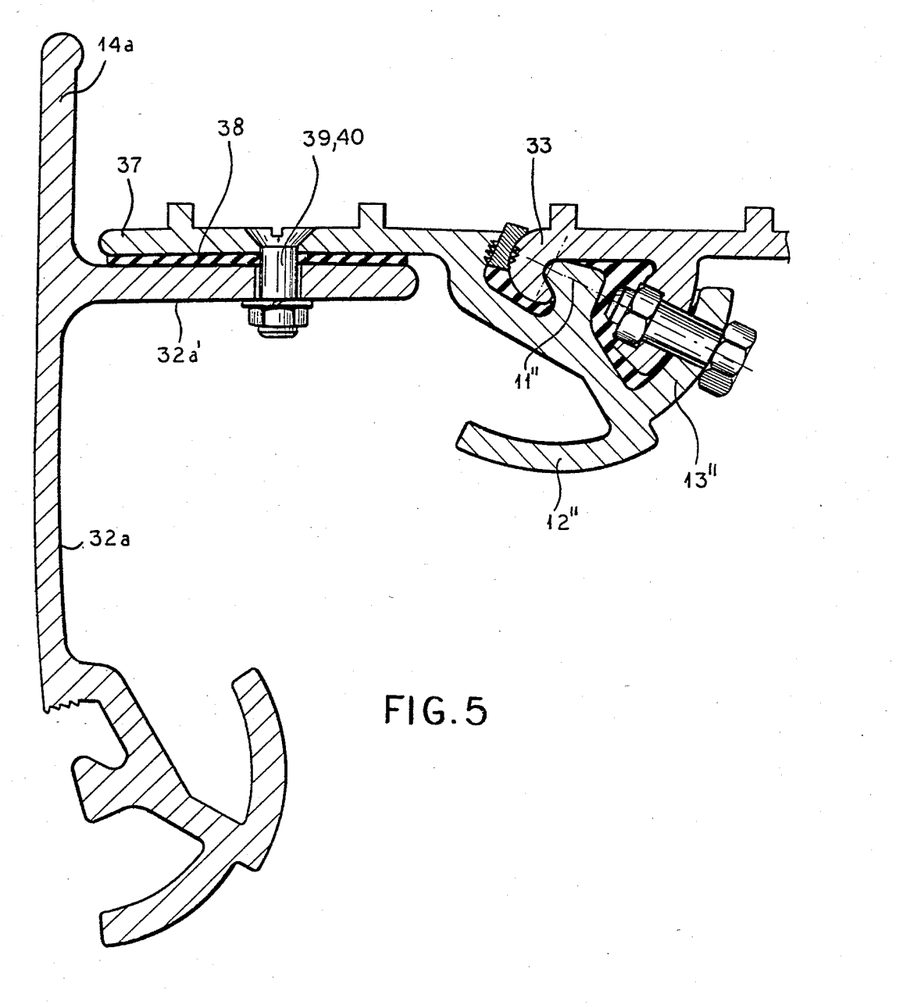
FIG. 5 is a vertical section through a planking assembly showing another connection as an alternative to the embodiment of FIG. 2.

In the embodiment of FIG. 5, however, the uppermost whole plank 32a, while provided with the upwardly extending rib 14a in the manner described with respect to the embodiment of FIG. 2, is not formed directly with a hook junction for the deck plank 33. Here the plank 32a is formed with a transverse flange 32a' and a piece 37 cut from a deck plank if bolted at 39, 40 to this flange 32a' via the intermediary of a sealing layer 38. The section 37 of deck planking, of course, is provided with the hook 11" and the arcuate flanges 12" and 13" allowing the formation of a junction of the type previously described with the full deck plank 33. The remaining deck planks are similarly interconnected over the width of the deck.

Figure 6:
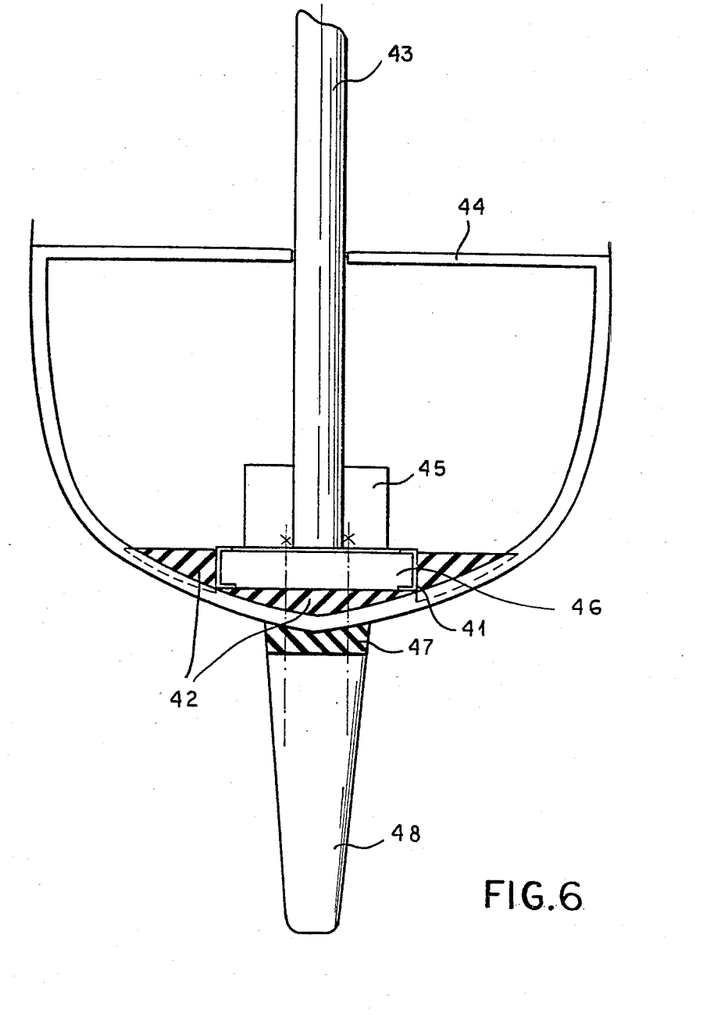
FIG. 6 is a vertical section diagrammatically showing an entire ship's hull in accordance with the invention.
Figure 7:
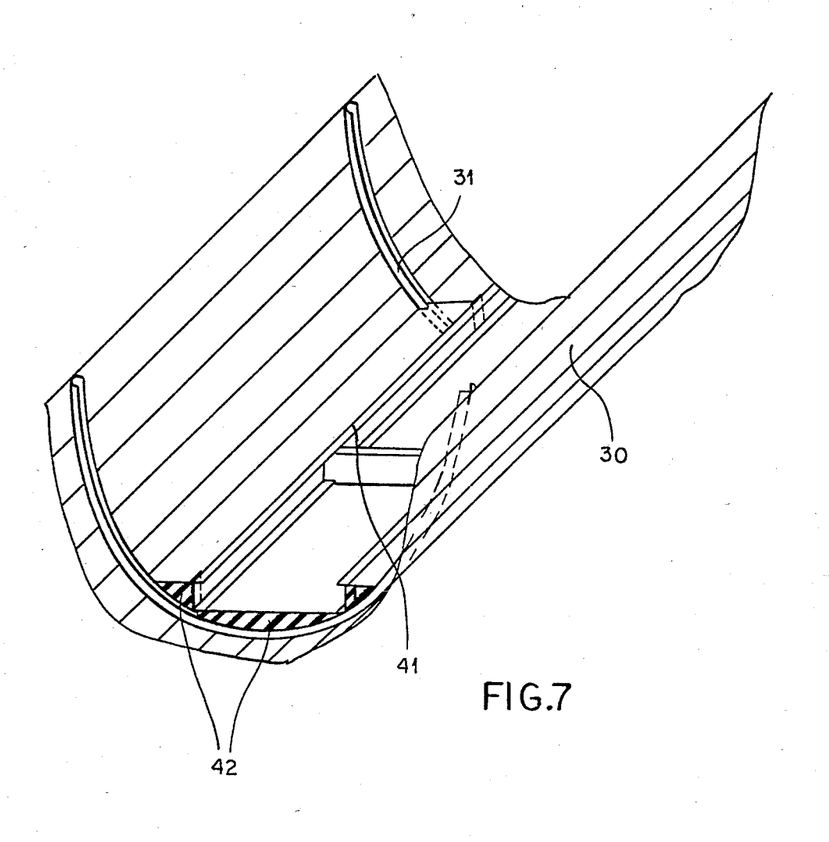
FIG. 7 is a diagrammatic perspective view showing the bottom reinforcement of the hull in greater detail.

To impart the requisite stiffness to the ship's hull, to resist various forces applied thereto and to distribute the major loads formed by the mast 43, the engine 45 and the keel 48, the lower part of the hull as can be seen from FIGS. 6 and 7 is provided with a frame 41 constructed of channel or U-section profile members which engages the motor mount, the keel and the mast support and is welded or otherwise secured to the transverse ribs 31. The frame 41 thus forms or is provided with a base 46 to form a bilge pan and support for the mast, this pan being laterally and below spaced from the ship's hull with the spacing being filled with a synthetic resin foam material. Between the ship's hull and the keel 48, moreover, a synthetic resin intermediate layer 45 is provided to limit electrolytic corrosion between the keel 48 formed from a heavy metal such as lead, and the hull which is composed of aluminum.

Figure 8:
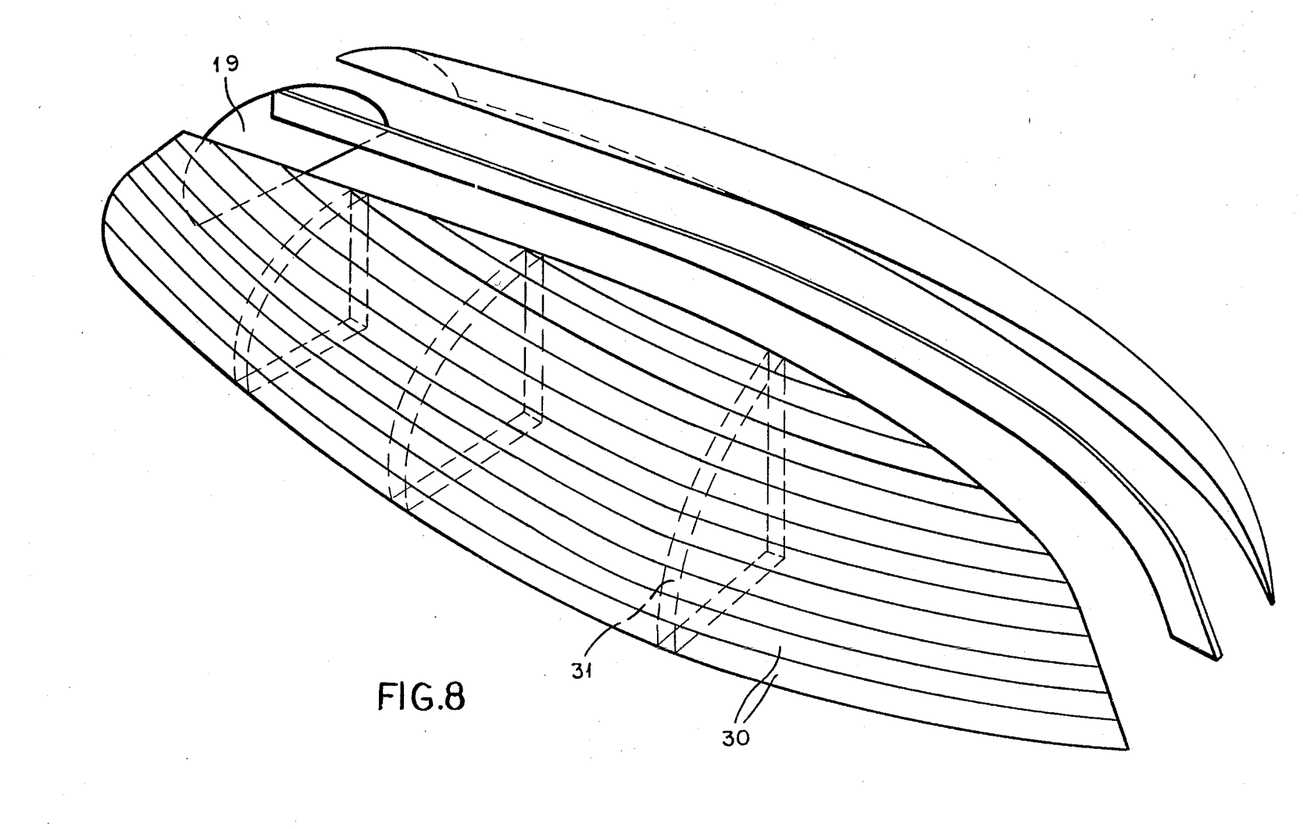
FIG. 8 is a diagrammatic exploded view which is intended to assist the explanation of the method of the invention.

As can be seen from FIG. 8, the ship's hull can be fabricated from two half shells which can be fabricated together with a frame or strut or truss construction securing the transverse ribs together and enabling the planks to be bolted to them. The profiles are then cut along the longitudinal median plane of the ship's hull to eliminate mutually projecting rib portions and are welded together along the longitudinal median plane in a keel seam and a deck seam.

Naturally, while aluminum is preferred, the profiles can also be formed from synthetic resin material or steel, especially stainless steel and instead of bolts, although these are preferred, can be welded together.

Before painting, any projecting portions of the wedges can be ground or otherwise removed so that the wedges are flush with the respective plank assemblies.

We claim:

1. A planking assembly for a ship's hull, comprising a pair of doubly curved longitudinally extending planks, one of said planks being formed with a longitudinally extending outer hook, the other of said planks being formed with a longitudinally extending inner hook engaging in said outer hook over the lengths of said planks and only in line contact therewith, said hooks interengaging with angular play about a pivot axis of said inner hook, and means for holding said hooks against one another in said line contact whereby a traction-type junction is formed between said planks over the entire lengths thereof, said planks being of uniform cross section over their entire lengths, each plank being formed with an arcuate flange of circular curvature centered on said axis spaced from each hook, said flanges being juxtaposed with one another, said assembly further comprising bolt means in line with said hooks interconnecting said flanges and drawing same together to hold said hooks in line engagement with one another.

2. The assembly defined in claim 1 further comprising a sealing layer between said flanges.

3. The assembly defined in claim 1 wherein said planks define in the region of said hooks a space opening outwardly in a longitudinally extending groove running the lengths of said planks, a sealing mass of permanently elastic material received in said space, said assembly further comprising a wedge driven into said groove for externally closing said space.

4. The assembly defined in claim 3 wherein said wedge has one flank having an arcuate curvature centered on said axis and another flank confronting a flank of said groove, said wedge having a cross section corresponding substantially to the cross section of said groove.

5. The assembly defined in claim 4 wherein the flanks of said groove and the flanks of said wedge are provided with mutually engaging sawtooth formations preventing outward movement of said wedge after it is driven into said groove.

6. The assembly defined in claim 1 wherein said hooks define between said planks a space extending the length of said planks, one of said planks having bores opening into said space, said assembly further comprising a sealing mass injected into said space through said bores.

7. The assembly defined in claim 1 wherein the plank formed with said inner hook is provided with an attachment flange coaxial with its arcuate flange, said assembly further comprising transverse ribs secured to flanks by bolts through said attachment flange, said attachment flange extending in a direction opposite to the direction in which the arcuate flange of the plank provided with the inner hook extends.

8. The assembly defined in claim 7 wherein each of said transverse ribs is formed with a channel configuration and a substantially U-cross section of semicircular profile to enable the attachment of said attachment flange thereto in various angular positions.

9. The assembly defined in claim 1 further comprising deck profiles connected to one of said planks with a joint corresponding to that between said planks, said deck profiles being provided with formations enabling a deck covering to be applied thereto.

10. The assembly defined in claim 9 wherein said one of said planks is provided with an inwardly extending flange and said deck plank is secured to said flange by a transition piece provided with a respective hook and bolted to said flange.

11. A planking assembly for a ship's hull, comprising a pair of doubly curved longitudinally extending planks, one of said planks being formed with a longitudinally extending outer hook, the other of said planks being formed with a longitudinally extending inner hook engaging in said hook over the lengths of said planks and only in line contact therewith, said hooks interengaging with angular play about a pivot axis of said inner hook, and means for holding said hooks against one another in said line contact whereby a traction-type junction is formed between said planks over the entire lengths thereof, said planks being of uniform cross section over their entire lengths, each plank being formed with an arcuate flange of circular curvature centered on said axis spaced from each hook, said flanges being juxtaposed with one another, said assembly further comprising bolt means in line with said hooks interconnecting said flanges and drawing same together to hold said hooks in line engagement with one another, the plank formed with said inner hook being provided with an attachment flange coaxial with its arcuate flange, said assembly further comprising transverse ribs secured to said flanks by bolts through said attachment flange, said attachment flange extending in a direction opposite to the direction in which the arcuate flange of the plank provided with the inner hook extends each of said transverse ribs being formed with a channel configuration and a substantially U-cross section of semicircular profile to enable the attachment of said attachment flange thereto in various angular positions, said transverse ribs having inwardly reinforced ends of said channels adapted to receive a bulk head between them.

12. A planking assembly for a ship's hull, comprising a pair of doubly curved longitudinally extending planks, one of said planks being formed with a longitudinally extending outer hook, the other of said planks being formed with a longitudinally extending inner hook engaging in said outer hook over the lengths of said planks and only inline contact therewith, said hooks interengaging with angular play about a pivot axis of said innner hook, and means for holding said hooks against one another in said line contact whereby a traction-type junction is formed between said planks over the entire lengths thereof, said planks being of uniform cross section over their entire lengths, each plank being formed with an arcuate flange of circular curvature centered on said axis spaced from each hook, said flanges being juxtaposed with one another, said assembly further comprising bolt means in line with said hooks interconnecting said flanges and drawing same together to hold said hooks in line engagement with one another, said assembly further comprising deck profiles connected to one of said planks with a joint corresponding to that between said plates, said deck profiles being provided with formations enabling a deck covering to be applied thereto, said one of said planks being provided with a rib having a hook directly engageable with a hook of said deck profile and a further rib extending substantially at 90° to the first mentioned rib thereabove.

* * * * *